United States Patent
Hofmann et al.

(10) Patent No.: US 7,627,063 B2
(45) Date of Patent: Dec. 1, 2009

(54) DEVICE AND METHOD FOR DETERMINING A TIME OF ARRIVAL OF A RECEIVE SEQUENCE

(75) Inventors: Guenter Hofmann, Litzendorf (DE); Marco Breiling, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 681 days.

(21) Appl. No.: 11/301,983

(22) Filed: Dec. 12, 2005

(65) Prior Publication Data
US 2006/0159206 A1 Jul. 20, 2006

(30) Foreign Application Priority Data
Dec. 13, 2004 (DE) .................. 10 2004 059 941

(51) Int. Cl.
*H03D 1/00* (2006.01)
(52) U.S. Cl. ..................................... 375/343
(58) Field of Classification Search ............... 375/130, 375/140, 147, 150, 316, 343, 142
See application file for complete search history.

(56) References Cited

U.S. PATENT DOCUMENTS

| | | | |
|---|---|---|---|
| 4,803,703 A | 2/1989 | DeLuca | |
| 6,009,334 A | 12/1999 | Grubeck et al. | |
| 6,424,683 B1 | 7/2002 | Schollhorn | |
| 7,068,704 B1 * | 6/2006 | Orr | ............. 375/139 |
| 2002/0009166 A1 | 1/2002 | Steffens et al. | |
| 2003/0053558 A1 | 3/2003 | Unger et al. | |
| 2003/0128161 A1 | 7/2003 | Oh et al. | |
| 2003/0215035 A1 | 11/2003 | Amerga et al. | |
| 2003/0227895 A1 | 12/2003 | Strutt et al. | |
| 2004/0072579 A1 | 4/2004 | Hottinen | |
| 2004/0170197 A1 | 9/2004 | Mehta | |
| 2004/0203871 A1 | 10/2004 | Geier et al. | |
| 2004/0240569 A1 | 12/2004 | Rudowicz et al. | |

FOREIGN PATENT DOCUMENTS

| | | |
|---|---|---|
| DE | 19802373 C1 | 1/1998 |
| EP | 0 632 577 | 1/1995 |
| EP | 0 933 882 | 8/1999 |

(Continued)

OTHER PUBLICATIONS

Li, Xinrong, et al.; Super-Resolution TOA Estimation With Diversity for Indoor Geolocation; Jan. 1, 2004; IEEE.

(Continued)

*Primary Examiner*—Tesfaldet Bocure
(74) *Attorney, Agent, or Firm*—Michael A. Glenn; Glenn Patent Group (57) ABSTRACT

A device for determining a time of arrival of a receive sequence in a receiver includes a correlation for determining a correlation value sequence from a correlation of the receive sequence with a transmit sequence, wherein the correlation sequence includes a peak shape having a main maximum and at least one local side maximum. The device further includes a processor to determine a point of the correlation sequence which lies within an interval which is on the one side bounded by the local side maximum and on the other side by the peak shape, and which is implemented to determine the time of arrival depending on the point.

14 Claims, 6 Drawing Sheets

FOREIGN PATENT DOCUMENTS

| EP | 1 089 452 | 4/2001 |
| EP | 1089452 A1 | 4/2001 |
| EP | 1206068 A2 | 5/2002 |
| WO | WO 03/001699 | 1/2003 |
| WO | WO 03/090400 A1 | 10/2003 |
| WO | WO 2005/098465 A2 | 10/2005 |

OTHER PUBLICATIONS

Harris, F. Multirate Signal Processing for Communication Systems. May 14, 2004. Prentice Hall. p. 400-407.

Fliege, N. Multiraten-signalverarbeitung. 1993. Germany. p. 256-258.

* cited by examiner

| |
|---|
| -0,00161106077678 |
| -0,00234731818860 |
| -0,00173182413480 |
| 0,00000000000004 |
| 0,00720377784510 |
| 0,01062413762642 |
| 0,00794256839925 |
| -0,00000000000012 |
| -0,02082456810098 |
| -0,03123125277165 |
| -0,02379167980953 |
| 0,00000000000023 |
| 0,04899080088419 |
| 0,07554931686914 |
| 0,05947272350759 |
| -0,00000000000036 |
| -0,10789013643074 |
| -0,17670997703090 |
| -0,15044737627148 |
| 0,00000000000047 |
| 0,29590602436736 |
| 0,62395779269402 |
| 0,88655696509758 |
| 0,99999999999949 |
| 0,88655696509758 |
| 0,62395779269402 |
| 0,29590602436736 |
| 0,00000000000047 |
| -0,15044737627148 |
| -0,17670997703090 |
| -0,10789013643074 |
| -0,00000000000036 |
| 0,05947272350759 |
| 0,07554931686914 |
| 0,04899080088419 |
| 0,00000000000023 |
| -0,02379167980953 |
| -0,03123125277165 |
| -0,02082456810098 |
| -0,00000000000012 |
| 0,00794256839925 |
| 0,01062413762642 |
| 0,00720377784510 |
| 0,00000000000004 |
| -0,00173182413480 |
| -0,00234731818860 |
| -0,00161106077678 |

DEVICE AND METHOD FOR DETERMINING A TIME OF ARRIVAL OF A RECEIVE SEQUENCE

BACKGROUND OF THE INVENTION

1. Field of the Invention

The present invention relates to a device and a method for determining a time of arrival of a receive sequence in a receiver, as they may in particular be employed for digital transmission systems.

2. Description of the Related Art

So that a receiver in a digital transmission system may be synchronized with a digital signal sent out by a transmitter, the transmitter emits a digital signal known to the receiver. It is the task of the receiver to determine the exact time of arrival (TOA) of the transmitted signal.

In order to determine the time of arrival, the cross-correlation between the digital receive signal and the known digital transmit signal is calculated.

Figure 4:
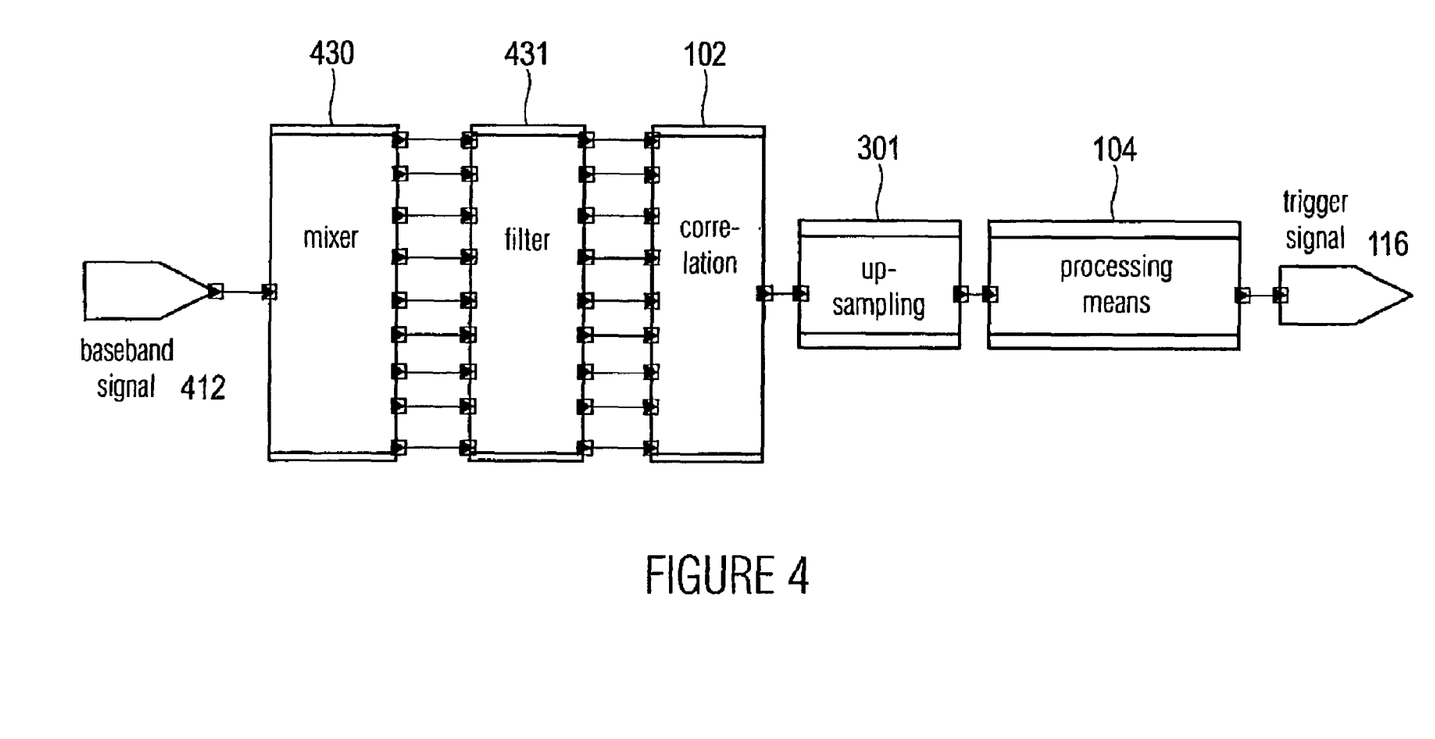
FIG. 4 shows a schematic illustration of a receiver having a device for determining a time of arrival according to an embodiment of the present invention.
Figure 5:
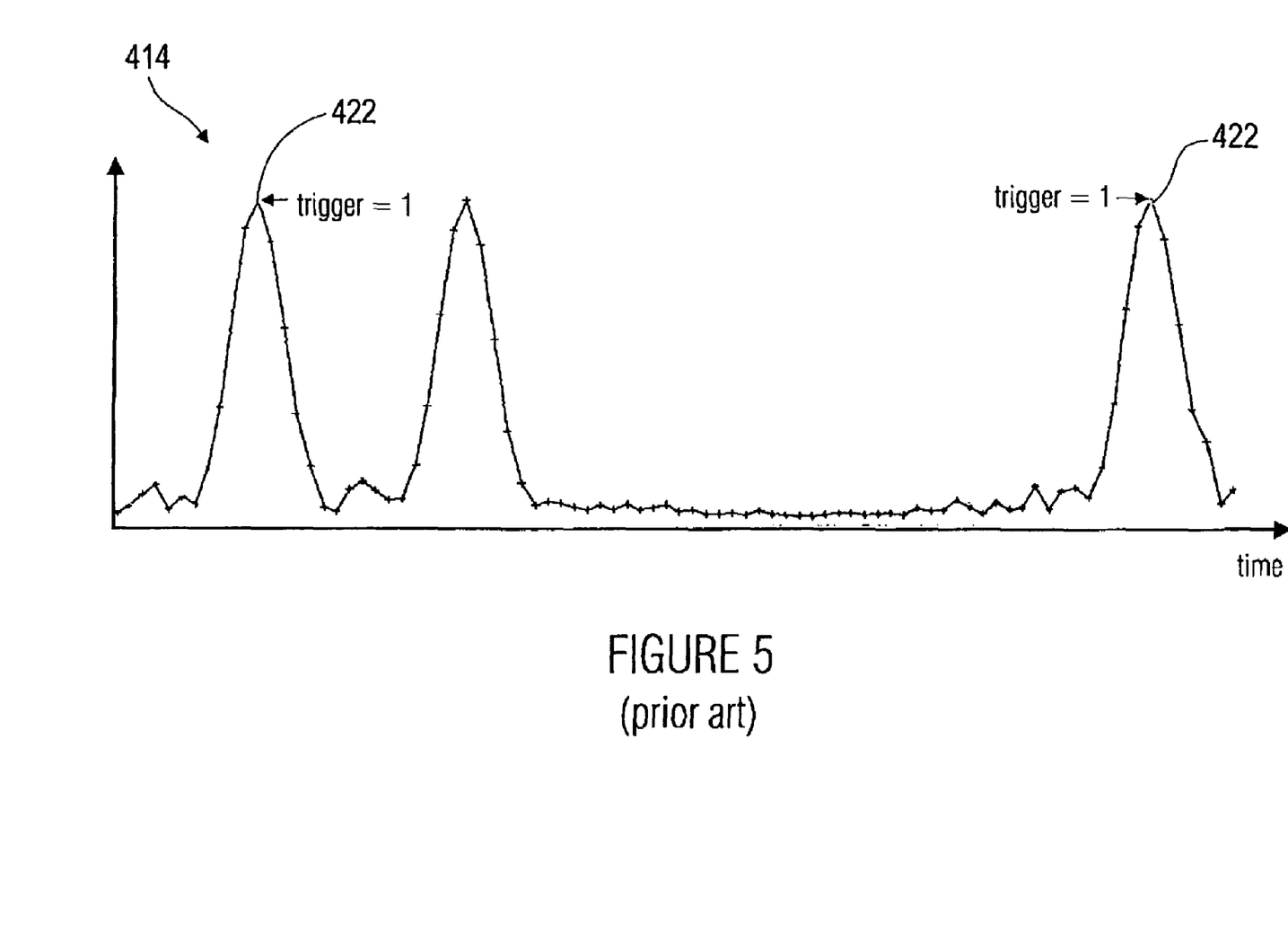
FIG. 5 shows a graphical illustration of a correlation sequence according to the prior art.

FIG. 5 shows a correlation sequence 414 plotted over time calculated from a continuous correlation of a received signal with a transmit signal stored in the receiver. The correlation peaks of the correlation sequence 414 shown in FIG. 4 indicate a correspondence of the stored transmit sequence with the receive sequence. In order to determine the time of arrival of the receive sequence from the correlation sequence 414, the magnitude maxima of the correlation sequence 414 are detected and the time of arrival of the receive signal is determined from the position of the correlation magnitude maximum. In FIG. 5, two main maxima 422, 422' are shown, for which a trigger signal indicating the time of arrival of the receive sequence is set equal to 1. A further main maximum between the maxima 422, 422' is not considered for the calculation of the time of arrival, as this maximum results from a multipath propagation.

If a correlation magnitude maximum in a predetermined range of correlation magnitude values or in a predetermined range of indices 1 of a correlation signal, respectively, is to be searched for, then the correlation magnitude maximum may be determined by determining the maximum of all correlation magnitudes existent in the predetermined range. If a correlation magnitude maximum is to be searched for with regard to a continuous signal, i.e. a stream of samples, then it has to be continuously assessed whether the correlation magnitude just calculated represents a valid local maximum or not. For determining such a local maximum a fixed threshold value may be used together with the rule, that a correlation magnitude maximum is present when a correlation magnitude to be assessed exceeds the threshold value.

A determination of the time of arrival depending on the main maximum value of a correlation sequence is inflexible and inaccurate, as there is no possibility of an adaptation to a changing transmission channel. Further, the main maximum of a correlation sequence is sensitive with regard to multipath propagation. This means, that the subsequent paths strongly influence the maximum, shift its position and thus corrupt the time of arrival. Further, the main maximum is prone to noise. Thus, the time of arrival of the receive sequence may be determined only very inaccurately from the correlation magnitude maximum, or an erroneous determination of the time of arrival may result, respectively, if a correlation magnitude maximum was erroneously detected. As a consequence of an erroneous determination of the time of arrival, a synchronization between transmitter and receiver may fail or an erroneous data transmission may result, respectively, if the synchronization may only be performed inaccurately, as the exact time of arrival of the receive sequence cannot be determined.

SUMMARY OF THE INVENTION

It is the object of the present invention to provide a device, a method and a computer program for determining a time of arrival of a receive sequence enabling a secure determination of the time of arrival.

In accordance with a first aspect, the present invention provides a device for determining a time of arrival of a receive sequence in a receiver, having a correlator which is implemented to determine a correlation sequence from a correlation of the receive sequence with a transmit sequence, wherein the correlation sequence comprises a peak shape having a main maximum; and a processor which is implemented to determine a point of the correlation sequence which lies within an interval which abuts on the main maximum, and which is implemented to determine the time of arrival depending on the point.

In accordance with a second aspect, the present invention provides a method for determining a time of arrival of a receive sequence in a receiver, with the steps of determining a correlation sequence from a correlation of the receive sequence with a transmit sequence, wherein the correlation sequence comprises a peak shape having a main maximum; and determining a point of the correlation sequence which lies within an interval which abuts on the main maximum, and determining the time of arrival depending on the point.

In accordance with a third aspect, the present invention provides a computer program having a program code, when the computer program runs on a computer, for performing the above-mentioned method.

The present invention is based on the finding that it is advantageous to perform the determination of the time of arrival of a receive sequence in a receiver not based on the main maximum of the correlation sequence but based on a point which is located within an interval around the main maximum. The receive sequence may be a part of a signal received by the receiver. The time of arrival indicates the point in time in which the receive sequence arrived within the receiver or was detected by the receiver, respectively. The time of arrival may, for example, be an absolute time information or also a trigger point in time. The point may be a value of the correlation sequence or a point arranged between two correlation values of the correlation sequence.

The use of a point within an interval around the main maximum is advantageous as such points are less sensitive with regard to multipath propagation as compared to the main maximum itself. This means, that the following paths influence such points less than the maximum. Further, points around the main maximum are more robust with regard to noise. This means, that the time of arrival may be determined more accurately using a point in an interval around the main maximum than using the main maximum itself.

According to one embodiment, the interval is arranged in time before the main maximum. This means that only those points are used for the determination of the time of arrival which correspond to the correlation values which were determined in time before the correlation value associated with the main maximum. This is advantageous in so far as the time of arrival may be determined more reliably as the influence of the multipath propagation before the main maximum has less effect than on the main maximum itself or on subsequent correlation values.

According to one embodiment, the point is a reversal point, a location of maximum gradient on the correlation value sequence or an extreme value (e. g. maximum) of the correlation value sequence. For determining the point, the first and second derivation of the correlation sequence may be determined, wherein the point may be an extreme value or a zero passing of the derivation.

According to one embodiment, the point is only searched for after a main maximum has been determined. This is advantageous in so far as the steps for calculating the point are only performed when a point of arrival has actually to be determined. By the presence of a main maximum at least the probability is high that the receive sequence searched for was received. At this point it is to be noted, that there may be several reversal points which do not all necessarily have to be valid.

According to another embodiment, potential points fulfilling the criteria for determining the time of arrival are continuously determined from the correlation sequence. As a result of the determination of a correlation maximum, the point determined last is determined to be the point with regard to which the time of arrival is determined. A continuous determination of possible points has the advantage that the time of arrival may be determined very quickly as the point was already determined before the main maximum is determined.

According to another embodiment, the correlation sequence is interpolated in order to be able to determine the time of arrival extremely accurately.

According to another embodiment, the time of arrival is determined depending on the main maximum of the correlation sequence if it is not possible to determine the potential point in time. This has the advantage that a time of arrival may at least be determined, even if it is not accurate, using which temporarily a further processing may be performed.

BRIEF DESCRIPTION OF THE DRAWINGS

Preferred embodiments of the present invention are explained in more detail in the following with reference to the accompanying drawings, in which:

FIG. 3b shows an overview of the filter coefficients used in FIG. 3a;

DESCRIPTION OF THE PREFERRED EMBODIMENTS

In the following description of the preferred embodiments of the present invention, for like elements illustrated in the different drawings, like or similar numerals are used, wherein a repeated description of these elements is omitted.

Figure 1:
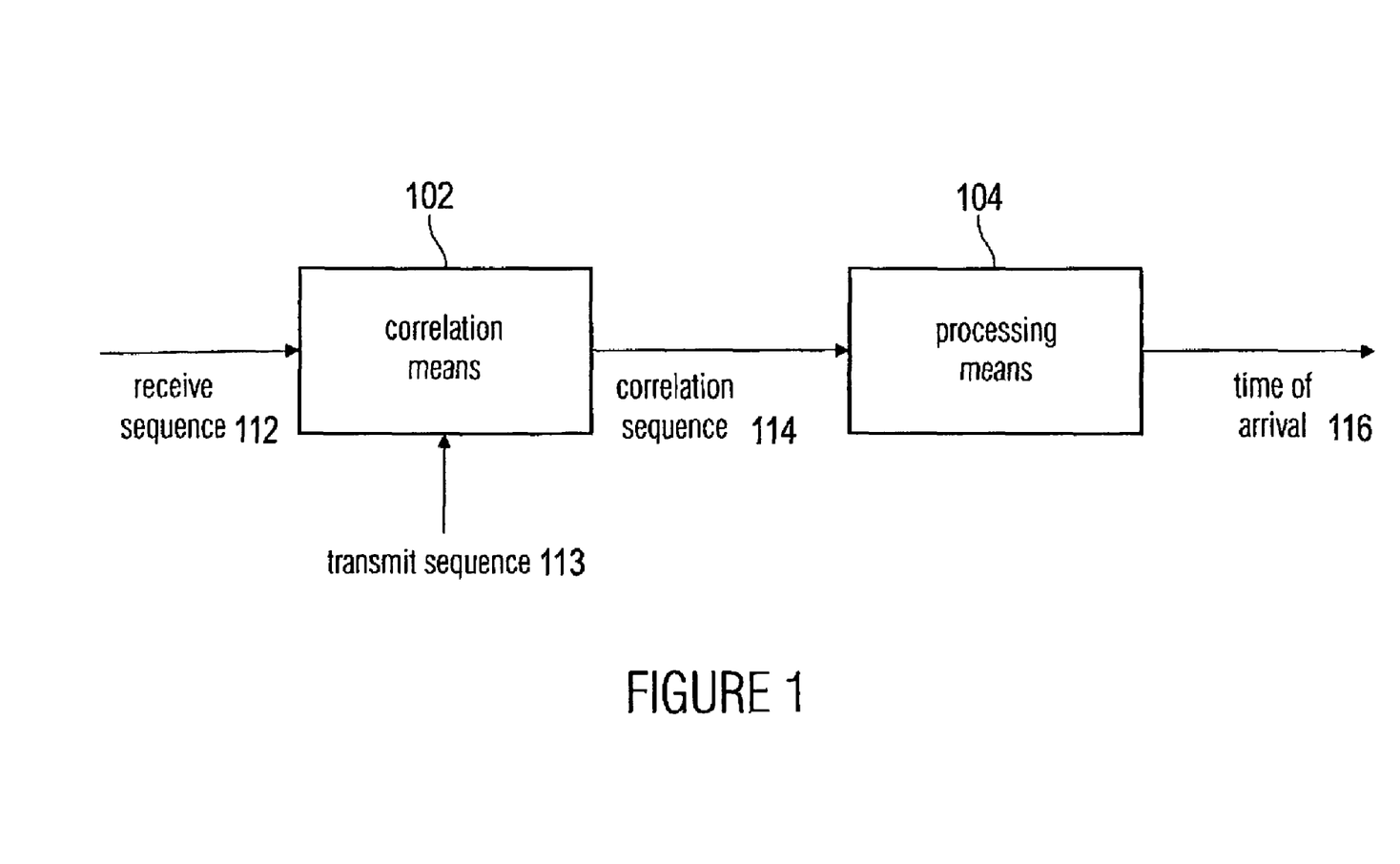
FIG. 1 shows a schematic illustration of a device for determining a time of arrival of a receive sequence according to an embodiment of the present invention.

FIG. 1 shows a schematic illustration of a device for determining a time of arrival of a receive sequence according to an embodiment of the present invention. The device comprises correlation means 102 and processing means 104. Correlation means 102 is implemented to receive a receive sequence 112. Further, correlation means 102 is implemented to receive a transmit sequence 112 or comprises a storage means (not illustrated in the figures), respectively, in which the transmit sequence 113 is contained. Correlation means 102 is implemented to perform a correlation between the receive sequence 112 and the transmit sequence 113 and to provide the correlation sequence 114 resulting from the correlation of the receive sequence 112 and the transmit sequence 113 to processing means 104. Processing means 104 is implemented to determine a point within an interval bordering on a main maximum of the correlation sequence 114 and to calculate and provide a time of arrival 116 based on this point which defines the arrival of the receive sequence 112. The main maximum is here not part of the interval or the correlation value representing the main maximum is excluded when determining the point, respectively.

According to this embodiment, the device for determining a time of arrival of a receive sequence is arranged in a receiver of a digital transmission system. The receive sequence 112 may be used for synchronizing the transmitter with the receiver. To this end, the transmit sequence 113 which is sent out by the transmitter and is received as a receive sequence 112 by the receiver is known to the device. In a perfect transmission with the exception of a carrier frequency offset between transmitter and receiver and a constant channel coefficient a and a delay L, the receiver receives the complex baseband signal $$y[k+L]=\alpha \cdot x[k] \cdot e^{j(2\pi \Delta Fk+\phi_0)}$$

when the transmitter sends out the transmit sequence x[k]. Correlation means 102 is implemented to correlate the receive signal y[k] with the original signal x[k] stored in the transmitter and receiver. The cross-correlation between receive signal y[k] and correlation sequence x[k] is defined as $$r_{yx}[1] = \sum_{k=0}^{K-1} y[k+1] \cdot x^*[k].$$

The index 1 here indicates by how far y[k] is to be shifted in the correlation calculation. If y[k] is shifted so that y[k+L] and x[k] optimally correspond, then the following is obtained as a correlation value $$r_{yx}[L] = \sum_{k=0}^{K-1} \alpha \cdot |x[k]|^2 e^{j(2\pi \Delta Fk+\phi_0)}.$$

In this case, the correlation sequence 114 has a maximum for which $r_{yx}[L]$ is maximum. In FIG. 1, the receive sequence 112 corresponds to the signal y, the receive sequence 113 corresponds to the signal x and the correlation sequence 114 corresponds to the signal r.

Processing means 104 is implemented to determine the arrival of the receive sequence 112 from the course of the values of the correlation sequence 114. For this purpose, processing means 104 is implemented to determine a main maximum of the correlation sequence 114. This may be performed using means for determining the main maximum (not illustrated in the figures) determining the correlation maximum by a threshold value decision. This means, a main maximum is present when a value of the correlation sequence 114 exceeds a certain threshold value.

Depending on the transmission system, means for detecting the main maximum may be implemented to detect the main maximum also under the influence of interference effects.

According to this embodiment, on the correlation magnitude sequence 114 a reversal point before the main maximum in a considered window is searched for. This means, first of all the main maximum is determined and then a step back in time is performed on the correlation magnitude curve 114 until the first reversal point is found. The reversal point is regarded as the point based on which the time of arrival is determined. For searching for the reversal point, the first and the second derivations of the correlation magnitude function 114 are required. As the derivations of the correlation magnitude function 114 are only present in a sampled way, the derivations may only be calculated approximately and in a sampled way. The location of the reversal point may thus primarily only be detected in the oversampling raster or in the sampling raster, respectively. For performing the derivation, processing means 104 may comprise means for forming the first and the second derivation of the correlation sequence 114.

After the determination of the reversal point positioned before the main maximum, a trigger signal is provided by processing means 104. The trigger signal indicates the time of arrival 116 of the receive sequence 112. The time of arrival 116 may be time information based on an internal clocking of the receiver. If the time of arrival is used for a synchronization of the receiver, it may also be sufficient only to provide a trigger signal to which the receiver may synchronize.

Alternatively, processing means 104 may be implemented to continuously determine reversal points on the correlation sequence 114. If additionally a main maximum is determined in the correlation sequence 114, then the reversal point 226 determined last is used for determining the time of arrival.

Figure 2:
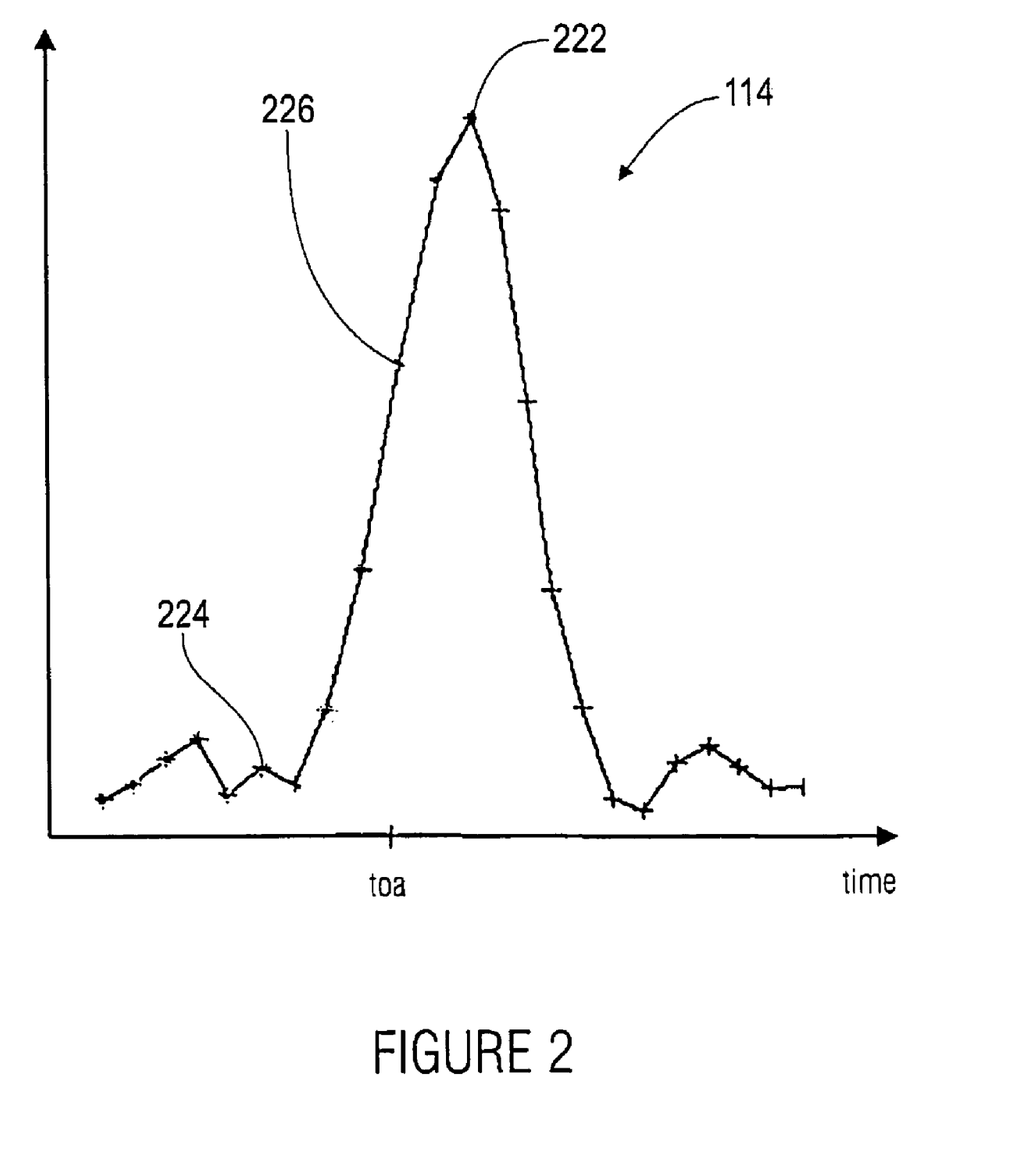
FIG. 2 shows a graphical illustration of a correlation according to an embodiment of the present invention.

FIG. 2 shows a graphical illustration of a correlation sequence 114. The correlation sequence 114 shown in FIG. 2 is a section of the correlation sequence shown in FIG. 4. In particular, FIG. 2 shows the first correlation peak in the correlation sequence shown in FIG. 4. The correlation sequence 114 comprises a plurality of correlation values calculated in correlation means indicated in FIG. 1. Three of those correlation values are designated by reference numerals. The correlation value 222 presents the main maximum, the correlation value 224 a local side maximum and the correlation value 226 a reversal point of the correlation sequence 114. The correlation values of the correlation sequence 114 are plotted over time. The correlation value 224 was calculated in time before the correlation values 226, 222 in correlation means 102. The correlation sequence 114 is a correlation magnitude sequence, i.e. the amplitude of the correlation values is plotted in a vertical direction.

The correlation sequence 114 comprises a peak shape towards the main maximum 222. The point 224 is a first side maximum before the main maximum 222. The correlation value following the side maximum 224 is a local minimum before the main maximum 222. Between the reversal point 226 and the correlation value located before the same, the gradient of the correlation sequence is maximum. From FIG. 2 it may be seen that also after the main maximum 222 a reversal point, a range of maximum gradient, a local minimum and a local side maximum are arranged.

According to this embodiment, for the determination of a time of arrival of a receive sequence in a receiver not the main maximum 222 is used but a point or a correlation value, respectively, arranged within an interval around the main maximum 222. According to this embodiment, the interval is bounded on the one hand by the local side maximum 224 and on the other hand by the main maximum 222. Which point within this interval is best suitable for the determination of the time of arrival, i.e. whose position on the time axis is least sensitive with regard to multipath propagation and noise, depends on the transmit sequence and the transmission system which are used. For example, the first local side maximum 224, the first local minimum, the area of the highest gradient (i. e. a reversal point) or the first reversal point before the main maximum 222 might be used for determining the time of arrival.

In this embodiment, the reversal point 226 is determined to be a suitable point for determining the time of arrival. To this end, on the correlation magnitude sequence 114 the reversal point before the main maximum in the regarded window or interval is searched for. This means, first of all the main maximum 222 is determined and then a step back in time is performed on the correlation magnitude curve 114 until the first reversal point 116 is found.

For the search of the reversal point, the first and the second derivation of the correlation magnitude function 114 are required. As this function is only present in a sampled way, i.e. the correlation sequence 114 only consists of the correlation values designated by crosses in FIG. 2, the derivations in processing means 104 shown in FIG. 1 may only be calculated approximately and also only in a sampled way. The location of the reversal point may thus primarily only be detected in a sampling raster.

Alternatively, the interval might also be spanned after the main maximum 222.

The receive sequence 112 and the transmit sequence 113 shown in FIG. 1 comprise complex values. An increase of the accuracy in the estimation of the time of arrival may be achieved by upsampling the complex correlation values calculated in correlation means 102. This may also take place by zero insertion and low-pass filtering. Subsequently, the magnitude of the upsampled complex correlation values is calculated and used for further processing.

Figure 3A:
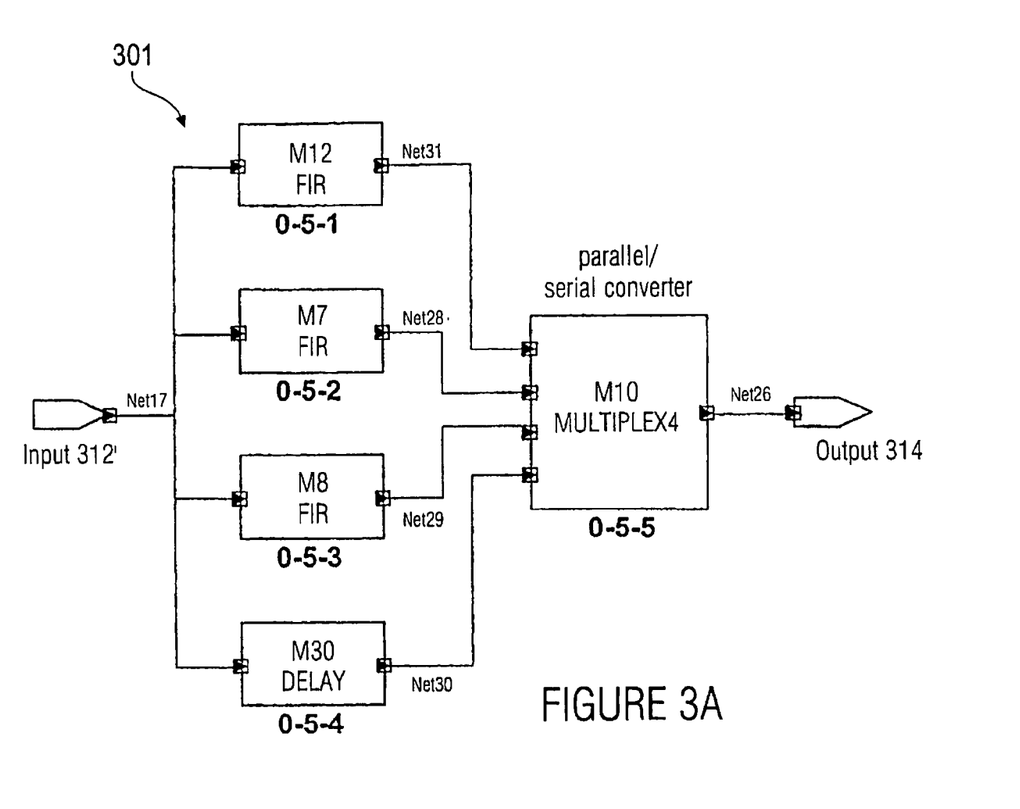
FIG. 3a shows a schematic illustration of an interpolation means according to an embodiment of the present invention.

FIG. 3a shows an embodiment of means for oversampling the correlation sequence in the form of a concrete realization as an upsampling filter in a polyphase structure. A correlation sequence 314' is provided as an input to the oversampling means which is output as an output 314 in the form of an oversampled correlation sequence. The upsampling filter shown in FIG. 3a comprises three FIR filters arranged in parallel designated as blocks 0-5-1, 0-5-2, 0-5-3. Delay means 0-5-4 is connected in parallel with the FIR filters. The inputs of the FIR filters and the delay means are connected to the input 314'. The outputs of the FIR filters and the delay means are connected to a parallel/serial converter 0-5-5, determining the oversampled correlation sequence 314 from the output values of the FIR filters and delay means.

Using the upsampling filter shown in FIG. 3a a possibility is provided to refine the position determination of the correlation maxima or the points of the correlation sequence used for determining the time of arrival, respectively. To this end, the correlation signal 314' obtained with a sample rate B_clock_16 is brought to a sample clock of B_clock_16*R by inserting (r−1) zeros and a subsequent low-pass filtering. R here designates the oversampling factor. For reasons of implementation, it may be advantageous either to omit the upsampling filter or to select another oversampling factor or to reduce the number of filter coefficients. In this embodiment, an upsampling filter is selected. Thus, the oversampling factor is set to be R=4.

In the implementation of the filter simplifications are possible. On the one hand, a polyphase implementation is possible. The input sequence 314' has a value different to zero only in every fourth digit. If the FIR filter is assumed to be in a "taped delay line" structure, then for the calculation of each output value only L/R coefficients are used. L here designates the FIR filter length. The used coefficients repeat periodically after exactly R output values. Thus, such an FIR filter may be separated into R partial filters of a length L/R. The outputs of the corresponding filters then only have to be multiplexed to a higher-rate data stream in the correct order.

A further simplification is obtained by the symmetry of the partial filters. The realization of the FIR filter leads to a regular coefficient structure for partial filters 0-5-2, i.e. straight lengths and axially symmetrical, and to a reduction of a fourth partial filter to the delay element 0-5-4.

The input data stream 314' is put in parallel onto four filters. I.e., after the reduction of the fourth partial filter put to a delay element 0-5-4 and three filters 0-5-1, 0-5-2, 0-5-3, and after filtering, the four parallel data streams net31, net28, net29, net38 are converted in block 0-5-5, representing the parallel/serial converter, to a serial data stream having the data rate B_clock_4. By this parallelization at the input, a change of port rates between input 314' and output 314 by the factor of 4 is achieved.

Figure 3B:
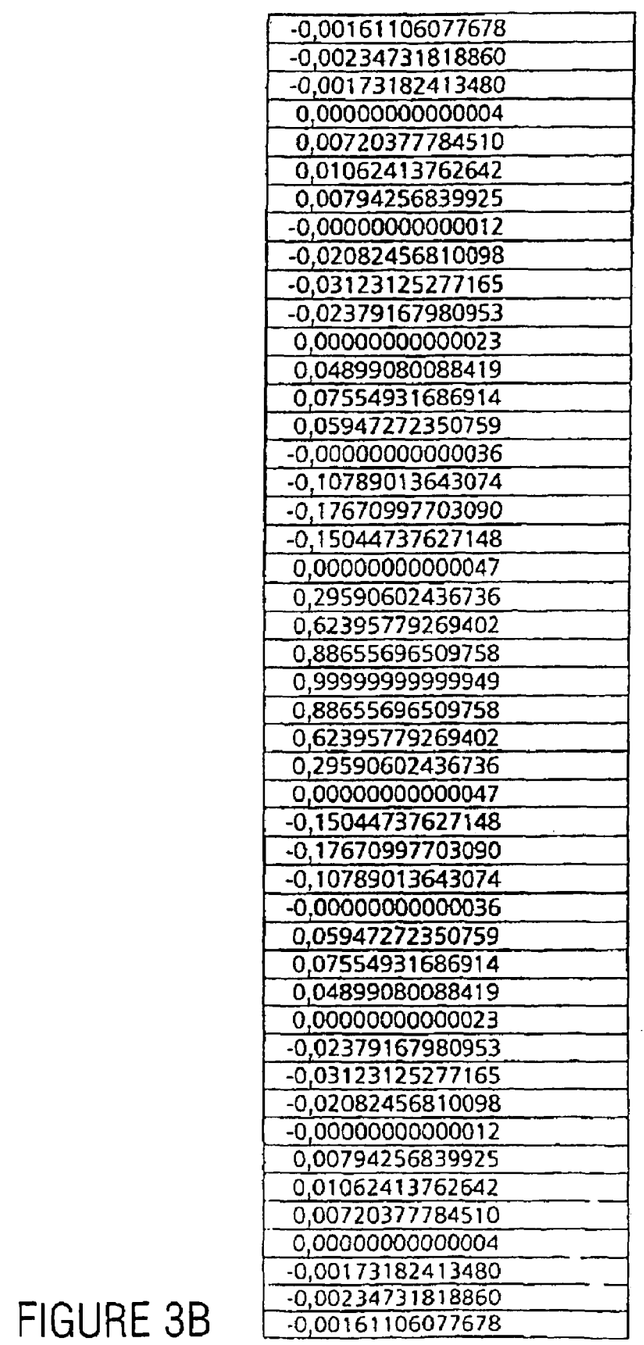

FIG. 3b shows the filter coefficients of the filter shown in FIG. 3a. From this, the partial filters are generated. As the second partial filter has an axially symmetrical structure of an odd length, this filter may further be shortened, i.e. at least halve the number of multiplications.

As the partial filter 4 is only occupied by a 1 at digit 6, this block may be substituted by a delay=5 by the delay element 0-5-4. This leads to a shifting of the input by five elements.

The correlation of the receive sequence 112 and the transmit sequence 114 shown in FIG. 1 may be performed using partial correlations. This is in particular sensible if a frequency offset between receive sequence and transmit sequence is present which might lead to canceling out the correlation value.

In order to determine the location of the point based on which the time of arrival is to be determined in a highly accurate way, processing means 104 shown in FIG. 1 may additionally comprise interpolation means performing an interpolation between the samples of the correlation sequence 114 shown in FIG. 2. The interpolation may, for example, be a linear interpolation. The interpolation may be performed for the complete correlation sequence. In the embodiment described in FIG. 2, in which based on the reversal point the time of arrival is determined, also an interpolation only between points in time around the reversal point may be performed. From this very finely-resolved estimation of the reversal point position, finally the time of arrival may be determined highly accurately.

The inventive method may be realized as a matlab function. According to one embodiment, a beacon beaconno is received by a receiver. In a subsample range, the first peak in the amount of the correlation values corrvals of the correlation sequence is searched for. The correlation values are transmitted as complex values and not as their magnitude. The algorithm of the embodiment operates eight times oversampled and with an early-late correlator on the derivation of the correlation magnitudes, so that the point in time of the steepest gradient or reversal point of the first peak may be determined very accurately.

According to this embodiment, the position of the first peak is output when no time of arrival may be determined from the reversal point. Further, a sync-los-TOA dataset may be generated. The normalized first derivation of the ideal T burst autocorrelation in the reversal point normalized to the magnitude in the reversal point is determined. Further, an upsampling of the correlation magnitude function is performed. An upsampled version of corrvals is generated by a padding with seven zeros after each value. This means that each eighth value is a correlation value. In a subsequent low-pass filtering, all spectral images of the upsampled signal are removed. An interpolation filter is here implemented such that the correlation values in the sample raster are really only interpolated and not amplified. That means, the coefficient 1 is located exactly in the middle and in a distance of 8 digits respectively only zeros are located. According to this embodiment, only the magnitude of the upsampled correlation values is interesting.

The first derivation of the upsampled correlation magnitude now contains the derivation between the sub-samples having indices i and i+1, i.e. practically the derivation in the index i+0.5. The second derivation is determined, wherein a dummy value 0 is put in front, so that the indices correspond to those of the sub-samples. For a TOA determination, i.e. the determination of the time of arrival, the position of the reversal point is determined. To this end, the main peak is searched for which does not have to be the first path, however. The approximate location of the first peak is searched for where for the first time a defined threshold t_peakthresh with regard to a maximum magnitude is reached. According to this embodiment, the first path may thus not be more than 10*log10(t_peakthresh) dB below the main path.

If applicable, the first path may be even less below the main path, if not the main ripple but a left side ripple of an auto-correlation is to be found. If exactly the main ripple has to be found, then by observing the auto-correlation it may be seen by which factor the first side ripple is below the maximum, so that one is on the safe side and not entering the side ripple with the factor t_peakthresh.

The correlation magnitude function has a reversal point before every peak, i.e. a point with a maximum first derivation. In the following, the index left next to the left reversal point, i.e. the last element having a positive second derivation, is searched for. After the determination of the index of the point directly to the left of the reversal point, by a linear interpolation the exact position of the reversal point is calculated. In the determination of the time of arrival the group run time of the filter is subtracted. If no reversal point is found, then, although a time of arrival could not really be determined, the position of the first peak is taken so that for the next burst the window continues in the right direction.

Further, a quality measure in the form of a deviation from the ideal curve is determined. The deviation from the ideal curve is a suitable quality measure also for noisy one-way reception, but mainly for multipath reception when the following paths are not much weaker than the first one. For this purpose, the indices of the upsampled correlation magnitudes left and right of the reversal point are determined. A linear interpolation of the correlation magnitude is determined exactly in the reversal point. Further, the indices of the derivation points left and right of the reversal point are determined. It is taken into account here that the indices of the first derivation are shifted by 0.5 with regard to the indices of the correlation magnitudes. After the linear interpolation of the derivation exactly in the reversal point, the normalized derivation in the reversal point is determined. The quality measure is now the log ratio of the actual normalized gradient in the reversal point to the ideal normalized gradient. If no reversal point was found, upsampling makes no sense. Thus, an extremely bad quality value is generated. In the implementation, the smallest representable value is used.

FIG. 4 shows a block diagram of a receiver having a device for determining the time of arrival of a receive sequence into the receiver according to an embodiment of the present invention. The device comprises correlation means 102, processing means 104 and upsampling means 301. A mixer 430 passes on a receive signal 412 converted into the complex baseband in a sample clock B_clock to a filter 431. The filter 431 is connected downstream from the mixer 430. A receive signal generated by the filter 431 comprising the receive sequence 112 shown in FIG. 1, is correlated with a known signal sequence in the correlation block 102. The correlation block 102 is implemented to continuously provide correlation magnitude values from which subsequently the time of arrival of the receive sequence is determined. The correlation magnitude values may then be upsampled in the following upsample block 301. In the following processing means 104, the reversal point of the upsampled correlation sequence is determined and the time of arrival is output in the form of the trigger signal 116.

Although in the preceding embodiments a digital communication system was referred to, the inventive approach may be used for determining a time of arrival of any sequence of data in a means. From the receive sequence, by cross-correlation, auto-correlation or other correlation types a correlation sequence may be determined from which in turn the time of arrival is determined.

Depending on the conditions, the inventive method for determining a time of arrival may be implemented in hardware or in software. The implementation may be performed on a digital storage medium, in particular a floppy disc or a DC having electronically readable control signals that may cooperate with a programmable computer system so that the corresponding method is performed. In general, the invention thus also consists in a computer program product having a program code stored on a machine-readable carrier for performing the inventive method when the computer program product runs on a computer. In other words, the invention may thus be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for determining a time of arrival of a receive sequence in a receiver, comprising:
   a correlator which is implemented to determine a correlation sequence from a correlation of the receive sequence with a transmit sequence, wherein the correlation sequence comprises a peak shape having a main maximum; and
   a processor which is implemented to determine a point of the correlation sequence which lies within an interval which abuts on the main maximum, and which is implemented to determine the time of arrival depending on the point.

2. The device according to claim 1, wherein the interval is bounded by the main maximum on the one side and wherein the main maximum is not part of the interval from which the point is determined.

3. The device according to claim 1, wherein the point is a reversal point, an extreme value or a point of maximum gradient in the correlation sequence.

4. The device according to claim 1, wherein the processor is implemented to determine a derivation of the correlation sequence and wherein the point is an extreme value or a zero crossing of the derivation.

5. The device according to claim 1, wherein the device comprises a detector which is implemented to determine the main maximum.

6. The device according to claim 1, wherein the device is implemented to determine the point as a result of a determination of the main maximum.

7. The device according to claim 1, wherein the device is implemented to continuously determine selection points and to determine, in response to a determination of the main maximum, the selection point as a point which lies within the interval.

8. The device according to claim 1, wherein the processor comprises an interpolator which is implemented to interpolate the correlation sequence and provide an interpolated correlation sequence, and wherein the processor is implemented to determine the point from the interpolated correlation sequence.

9. The device according to claim 1, wherein the device is implemented, in response to a determination of the point, to provide a trigger signal having information about the time of arrival.

10. The device according to claim 1, wherein the device is implemented to determine the time of arrival depending on the main maximum when no point is determinable in the interval.

11. The device according to claim 1, wherein the correlation sequence comprises at least one local side maximum; and wherein the interval is bounded on the one side by the local side maximum and on the other side by the peak shape.

12. The device according to claim 1, wherein the point is located before the main maximum.

13. A computer apparatus for determining a time of arrival of a receive sequence in a receiver, said apparatus comprising:
   a correlator module determining a correlation sequence from a correlation of the receive sequence with a transmit sequence, wherein the correlation sequence comprises a peak shape having a main maximum; and
   a processor determining a point of the correlation sequence which lies within an interval which abuts on the main maximum, and determining the time of arrival depending on the point.

14. A computer-readable medium containing a set of instructions that cause a computer to perform a process of performing the method for determining a time of arrival of a receive sequence in a receiver, comprising:
   determining a correlation sequence from a correlation of the receive sequence with a transmit sequence by means of a correlator, wherein the correlation sequence comprises a peak shape having a main maximum; and
   determining a point of the correlation sequence which lies within an interval which abuts on the main maximum, and determining the time of arrival depending on the point by means of a processor.

* * * * *